Patented Mar. 29, 1938

2,112,517

UNITED STATES PATENT OFFICE 2,112,517

PROCESS OF MAKING LEATHER-RUBBER MATERIAL

Donald E. Cable, Rutherford, N. J., assignor, by mesne assignments, to United States Rubber Company, New York, N. Y., a corporation of New Jersey No Drawing. Application October 10, 1933, Serial No. 692,991

3 Claims. (Cl. 92—21)

This invention relates to a process of making leather-rubber material and more particularly to leather-rubber sheet material made from aqueous suspensions of leather fibres and aqueous dispersions of rubber, such as rubber latex.

Leather-rubber sheet material is commonly made from leather scrap or dust or leather shavings by beating the same until the fibres are in the desired suspended form in water. The resulting suspension of leather fibres is then commonly made alkaline by the addition of alkaline salts or free bases, and thereafter an alkali-preserved aqueous dispersion of rubber is added to the mixture. A coagulant, for example aluminum sulphate, is then added to precipitate the rubber in the mixture, which is then filtered on an ordinary paper-making screen. Sheets may then be manufactured from the filtered material by drying, pressing and finishing as desired. Previous attempts to prepare rubber-leather products containing as much as 33% of rubber by the coagulation of rubber from latex upon leather fibres suspended in an aqueous vehicle, have resulted in products containing numerous visible clots or lumps of rubber relatively free of fibres, due to the coagulation of the rubber particles before they could become attached to the fibres. Such clots of rubber give to the product a coarse grained structure and unsightly appearance. In the manufacture of rubber-leather products by methods comprising the admixture of aqueous leather fibre suspensions and aqueous dispersions of rubber and the coagulation of the rubber in the resulting mixtures, it has not been previously recognized that substantial swelling of the leather fibre occurs in the range of OH ion concentrations on the alkaline side of neutrality and is especially pronounced above a pH of about 7.8, while a minimum of swelling occurs in the range of pH values from about 4.2 to about 7.8. I have now discovered that greatly improved rubber-leather products may be obtained by such processes wherein the pH of the fibrous suspension is maintained throughout the process at such values that a minimum of swelling of the fibre is insured.

The present invention relates to a process of making rubber-leather products from suspensions of leather fibre and rubber wherein the pH of the aqueous vehicle is maintained at values from about 4.2 to 7.8, and preferably at values not higher than 7.0, throughout the steps of beating the fibres and all the subsequent operations, particularly that of incorporating the aqueous dispersion of rubber with the fibre suspension. By the present method a dispersion of negatively charged rubber particles is preferably added to an aqueous leather fibre suspension the fibres of which are positively charged and are suspended in an aqueous medium having a pH from about 4.2 to 6.5. The resulting product consists of a porous sheet or mass of felted leather fibres with latex rubber intimately and uniformly distributed throughout the mass and affixed to the individual fibres. The products are especially characterized by the absence of any visible lumps or clots of rubber, and therefore have an unusually fine grained structure and pleasing appearance. In their resistance to piping, cracking and wet scuffing, the products compare favorably with high-grade leather. They are particularly suitable for the manufacture of such articles as insoles, upholstery, luggage, and the like.

As a specific illustration of carrying out the present invention, but without intention to limit the invention except as required by the prior art, the following present preferred method of carrying out the invention is described in detail.

Water-leached chrome leather scrap, shavings or dust or mixtures of the same are diluted with water to a consistency of 1.0 to 1.5 parts of leather per 100 parts of water and beaten to form a uniform suspension of the individual leather fibres which may have a pH from about 5.6 to 6.5. The suspended mineral tanned fibres are known to carry positive electric charges and therefore have an affinity for negatively charged particles such as latex globules, and are capable of adsorbing rubber particles up to about 20 or 30% of the weight of the fibres. The affinity of the leather fibre for the latex globules may be increased by the addition of a relatively small amount of di- or tri-valent cation material, such as zinc chloride, aluminum sulphate, alum, or the like, preferably added some little time prior to the addition of the latex in order to permit adsorption of said ions by the fibres. For example, ten parts of hydrated aluminum sulphate per 100 parts of suspended leather fibres may be added to the suspension to increase the adsorbing capacity of the fibres for the rubber particles to 50% or more of the weight of the fibres. The pH of the thus treated fibre suspension remains around 5.0 to 6.2. The aluminum sulphate added also insures that the pH of the fibre suspension will remain below 7.8 during the subsequent addition of an alkaline latex. The mixture is preferably allowed to stand for at least one-half hour, and the latex may then be added in such amount as to provide up to about one part of rubber to two parts of fibre (on a dry basis). By such method the precipitation of the rubber directly onto the fibres begins immediately upon the addition of the latex to the mildly acidic fibre suspension, whereby substantially all of the rubber globules become firmly and uniformly affixed to the individual leather fibres, and there is formed a free-flowing suspension of individually rubberized fibres which is capable of being subjected to the further paper-making operations such as pumping, recirculation, and screening. The pH of the fibre suspension prior to the addition of the latex is preferably kept between about 4.2 and 6.5. By the maintenance of the pH of the system continuously between 4.2 and 7.8, and preferably between 4.2 and 7.0, during the subsequent addition of the latex, a slow, controlled and complete coagulation or deposition of the rubber globules from the dispersion onto the leather fibres takes place. This deposition on the fibres takes place chiefly due to the attraction between the negative charges of the latex globules and the positive charges on the chrome leather fibre, the latter preferably being augmented by the addition of a di- or trivalent cation material such as aluminum sulphate, as above described. In place of the usual alkaline latex I may employ an acid latex having a pH of above 4.5 and wherein the rubber globules are negatively charged. Such acid latex may be prepared by well known methods such as are disclosed, for example, in the patents to McGavack and Shive Nos. 1,699,368 and 1,699,369 granted January 15, 1929. A normal latex of which the ammonia content has been substantially reduced by air-blowing, or treatment with formaldehyde or silica gel, or by other methods, may also be used in the process to good advantage. Another method of insuring the maintenance of the pH between 4.2 and 7.8 is by the addition of an acid material in an amount equivalent to the known amount of ammonium hydroxide or other base in the added alkaline latex. The system, after the addition of the desired amount of latex, should preferably contain up to about 33% rubber (on the dry combined solids) and have a pH above 5.0 and below 7.0, preferably around 6.5. If the rubber particles have not been completely coagulated, a small amount of acid reacting material such as aluminum sulphate, acetic acid or the like may if desired be added to completely clear the serum and aid in filtering. The water suspended fibres with rubber deposited on them may then be flat screened, if desired, and are then filtered in the ordinary manner, using paper, paper board, wet machines or other sheet forming equipment. The felted or interlocking fibre structure is then pressed, dried, and finished as desired.

The leather fibre is preferably mineral tanned but vegetable tanned fibres may be used alone or mixed with the mineral tanned fibres. Vegetable tanned fibres, however, require the adsorption of larger amounts of di- or tri-valent cations to provide a suspension having the desired characteristics. The aqueous dispersion of rubber added to the suspension of leather fibres may take the form of a natural (normal or concentrated) latex or an artificial dispersion of rubber or rubber-like material. Unvulcanized or vulcanized latex, for example, may be used, and if unvulcanized, the rubber deposit on the fibres may be subsequently vulcanized, or not, as desired. The manufacture of a simple leather-rubber combination has been described above, but it is obvious other constituents, such as cellulose fibre (from cotton or chemical wood pulp), organic or mineral coloring matter, zinc oxide, rubber curatives, accelerators and anti-oxidants, may be incorporated with the fibre and rubber materials.

With the above detailed disclosure of the invention, it is evident that numerous modifications will suggest themselves to those skilled in the art, and it is not desired to limit the invention otherwise than as set forth in the appended claims.

Having thus described my invention, what I claim and desire to protect by Letters Patent is:

1. The process of making leather-rubber material comprising forming an aqueous suspension of leather fibres, mixing therewith a water-soluble salt of a polyvalent metal and thereafter allowing sufficient time for substantial adsorption of multi-valent cations by the fibres to take place while maintaining the pH of the thus treated suspension at from about 4.2 to 6.5, subsequently mixing with such suspension an aqueous dispersion of rubber in which the dispersed rubber particles are negatively charged while maintaining the pH of the resulting mixture between 4.2 and 7.8 whereby the rubber becomes firmly and uniformly attached to the fibres, abstracting liquid, drying and finishing.

2. The process of making leather-rubber material comprising forming an aqueous suspension of leather fibres, mixing therewith a water-soluble salt of a polyvalent metal to effect substantial adsorption of multi-valent cations by the fibres while maintaining the suspension at a pH of from about 4.2 to 6.5, thereafter mixing therewith an aqueous dispersion of rubber in which the dispersed rubber particles are negatively charged while maintaining the pH of the resulting mixture between 4.2 and 7.8, then adding a small amount of acid reacting material to completely clear the serum and coagulate any still uncoagulated rubber particles, abstracting liquid, drying and finishing.

3. In the process of making leather-rubber material, the step of mixing an aqueous dispersion of negatively charged rubber particles with an aqueous suspension of leather fibers having a pH value of from about 4.2 to about 6.5 and having adsorbed on the fiber sufficient polyvalent cations to effect the coagulation and deposition on the fibers of 20–50% of rubber, referred to the dry fiber weight, upon admixture of said rubber dispersion, while maintaining the pH of said mixture between 4.2 and 7.8.

DONALD E. CABLE.